United States Patent [19]

Yamamoto et al.

[11] Patent Number: 4,930,004
[45] Date of Patent: May 29, 1990

[54] AUTOMATIC LEVEL ADJUSTING SYSTEM FOR A TELEVISION RECEIVER

[75] Inventors: Yoshihiro Yamamoto, Tokyo; Junya Saito; Masakazu Suzuki, both of Saitama, all of Japan

[73] Assignee: Sony Corporation, Tokyo, Japan

[21] Appl. No.: 332,003

[22] Filed: Mar. 31, 1989

[30] Foreign Application Priority Data

Apr. 15, 1988 [JP] Japan .................................. 63-092690

[51] Int. Cl.$^5$ ............................................. H04N 9/73
[52] U.S. Cl. ........................................ 358/29; 358/34
[58] Field of Search ................... 358/21 R, 21 V, 160, 358/29, 41, 79, 26, 232, 242, 34

[56] References Cited

U.S. PATENT DOCUMENTS

| | | | |
|---|---|---|---|
| 4,646,161 | 2/1987 | Tsuchiya et al. | 358/41 |
| 4,679,065 | 7/1987 | Umezawa | 358/29 |
| 4,700,218 | 10/1987 | Thomsen et al. | 358/29 |
| 4,706,108 | 11/1987 | Kumagai et al. | 358/29 |
| 4,746,970 | 5/1988 | Hosokawa et al. | 358/29 |
| 4,797,733 | 1/1989 | Takagi et al. | 358/29 |
| 4,860,092 | 8/1989 | Hieda | 358/29 |

FOREIGN PATENT DOCUMENTS 0178923 4/1986 European Pat. Off. .

Primary Examiner—Howard W. Britton
Assistant Examiner—Tommy D. Lee
Attorney, Agent, or Firm—Philip M. Shaw, Jr.

[57] ABSTRACT

An automatic level adjusting system for a television receiver which is suitable as its automatic white balance adjusting circuit. In the manufacturing-process of the television receiver, desired data is selected from a positional data group of black or white reference pulse signal to be inserted into a video signal and is stored in a non-volatile memory, whereby when an image is reproduced, black or white level of the video signal is adjusted automatically on the basis of the data stored in the non-volatile memory. Thus, the insertion position of black or white reference pulse signal can be changed without modifying the hardware of the television receiver so that the automatic level adjusting system can be applied commonly to different types of television receivers.

17 Claims, 8 Drawing Sheets

AUTOMATIC LEVEL ADJUSTING SYSTEM FOR A TELEVISION RECEIVER

BACKGROUND OF THE INVENTION

1. Field of the Invention

The present invention relates generally to a television receiver and, more particularly, is directed to an automatic level adjusting system suitable for use as an automatic white balance adjusting circuit of a television receiver.

2. Description of the Prior Art

A prior-art television receiver is provided with an automatic white balance adjusting circuit in order to obtain white color of the same chromaticity regardless of the change of the brightness level.

Figure 1A:
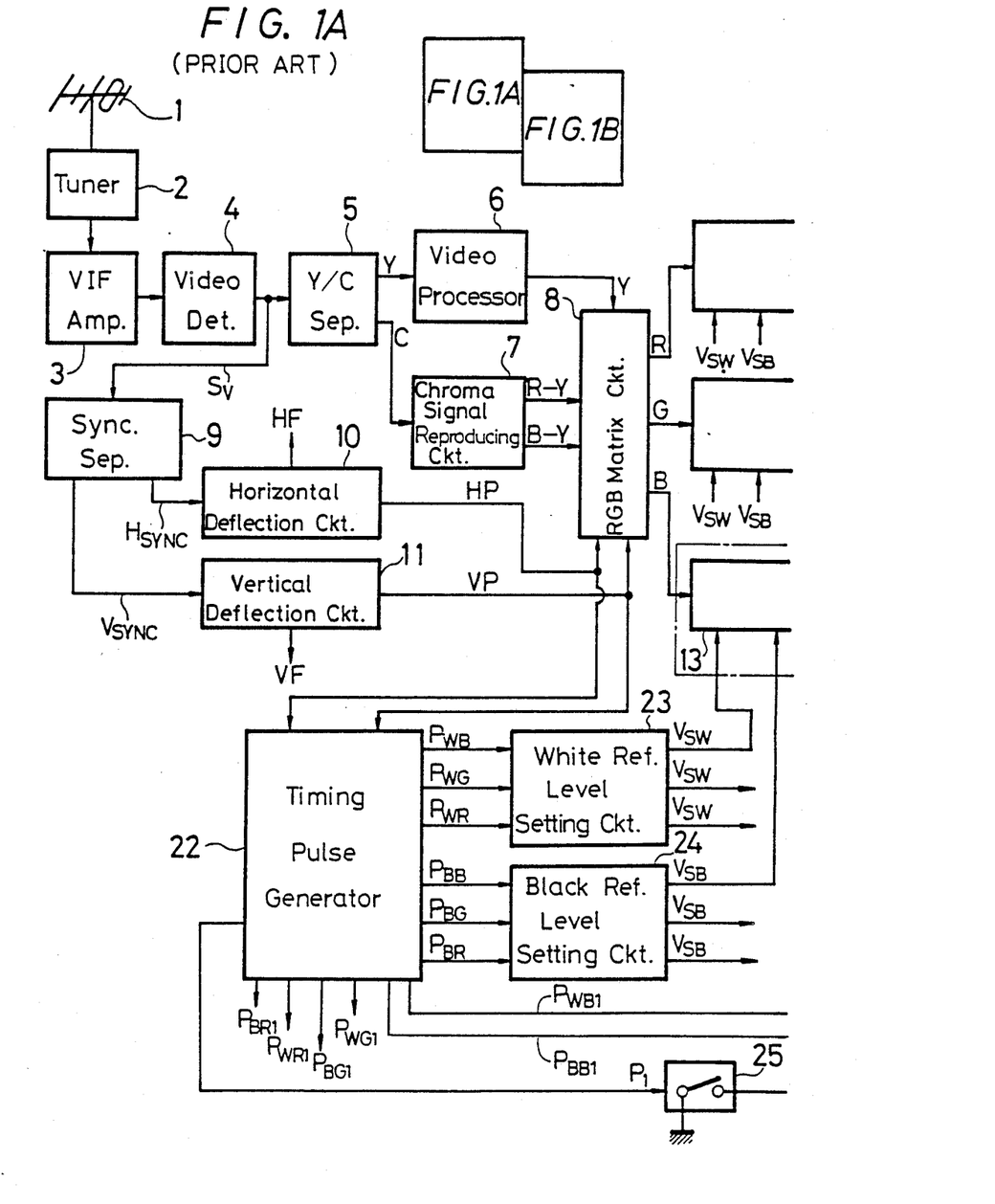
Figure 1B:
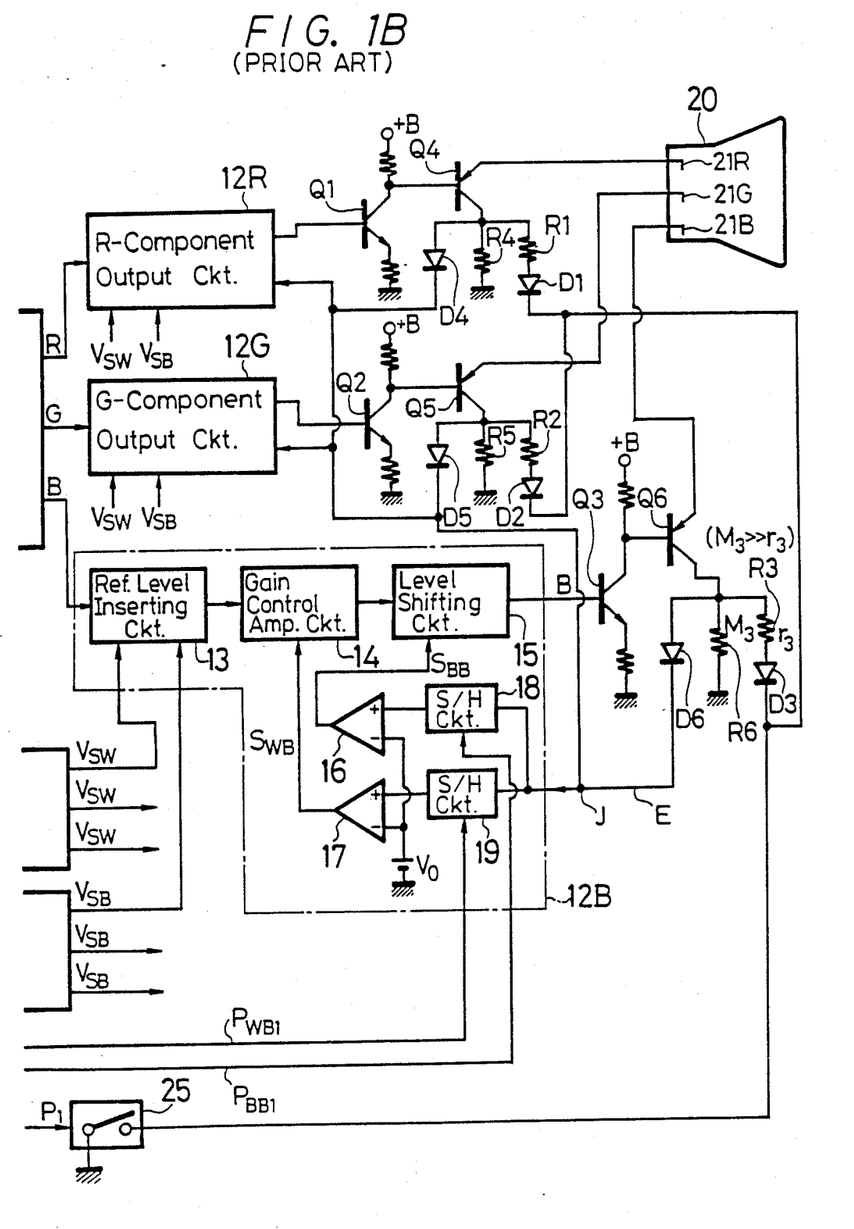

FIG. 1 (FIG. 1 is formed of FIGS. 1A and 1B with FIG. 1A to the left of and partly overlapping FIG. 1B) is a block diagram showing a television receiver having an automatic white balance adjusting circuit that is previously proposed by the same assignee of the present application. This television receiver is disclosed in official gazette of Japanese laid-open patent application No. 60-186185 and will be described herein-below.

Referring to FIG. 1, a television broadcast signal is received at an antenna 1 and is supplied through a tuner 2, a video intermediate frequency (VIF) amplifying circuit 3 to a video detecting circuit 4 which produces a video signal $S_V$ and supplies the same to a Y/C separating circuit 5. The Y/C separating circuit 5 separates the video signal $S_V$ into a luminance signal Y and a chroma signal C which are then fed to a video processing circuit 6 and to a chroma signal reproducing circuit 7, respectively. The video processing circuit 6 processes the luminance signal Y such that it undergoes picture-adjustment, level-clamping or the like. The, thus processed, luminance signal Y is supplied to an RGB matrix circuit 8. The chroma signal reproducing circuit 7 effects color-demodulation by utilizing a color burst signal, thereby producing color difference signals R-Y and B-Y. The color difference signals R-Y and B-Y are then supplied to the RGB matrix circuit 8.

Further, the video signal $S_V$ from the video detecting circuit 4 is supplied to a synchronizing separating circuit 9, from which horizontal and vertical synchronizing signals $H_{SYNC}$ and $V_{SYNC}$ are derived. The horizontal and vertical synchronizing signals $H_{SYNC}$ and $V_{SYNC}$ are supplied to a horizontal deflection circuit 10 and a vertical deflection circuit 11, respectively. The horizontal deflection circuit 10 generates a horizontal blanking pulse HP in synchronism with the horizontal synchronizing signal $H_{SYNC}$ and supplies it to the RGB matrix circuit 8 and to a timing pulse generating circuit 22 that will be described later. Also, a horizontal deflection signal HF is generated from the horizontal deflection circuit 10 and is fed to a horizontal deflection coil (not shown). Similarly, the vertical deflection circuit 11 generates a vertical blanking pulse VP in synchronism with the vertical synchronizing signal $V_{SYNC}$ and supplies to the RGB matrix circuit 8 and to the timing pulse generating circuit 22. A vertical deflection signal VF is generated from the vertical deflection circuit 11 and is fed to a vertical deflection coil (not shown).

The RGB matrix circuit 8 generates three primary color signals, for example, a red signal R, a green signal G and a blue signal B on the basis of the luminance signal Y, the color difference signals R-Y and B-Y and the horizontal and vertical blanking pulses HP and VP.

The RGB matrix circuit 8 supplies the red, green and blue primary color signals R, G and B to an R-component output circuit 12R, a G-component output circuit 12G and a B-component output circuit 12B. The output circuits 12R, 12G and 12B are each constructed in the same way and therefore only the B-component output circuit 12B will be described in detail, for simplicity.

The B-component output circuit 12B comprises a reference level inserting circuit 13, a gain control amplifying circuit 14 and a level shifting circuit 15. The reference level inserting circuit 13 is operative to add the blue signal B with a white reference level $V_{SW}$ or a black reference level $V_{SB}$ that will be described later. The gain control amplifying circuit 14 is operative to adjust the white level of the blue signal B in response to a control signal $S_{WB}$ which will be described later. The level shifting circuit 15 is operative to adjust the black level of the blue signal B in response to a control signal $S_{BB}$ which will be described later.

The B-component output circuit 12B further includes differential amplifiers 16, 17 and sample-and-hold (S/H) circuits 18, 19. Both of the sample-and-hold circuits 18 and 19 sample and hold a voltage corresponding to a current flowing through a blue cathode 21B of a cathode ray tube (CRT) 20 at predetermined timings and supply the thus held outputs to non-inverting input terminals of the differential amplifiers 16 and 17. The differential amplifiers 16 and 17 receive at their inverting input terminals a reference level signal $V_O$, and feed the control signals $S_{BB}$ and $S_{WB}$, which correspond to a difference between the signals fed from the sample-and-hold circuits 18, 19 and the reference level signal $V_O$, back to the level shifting circuit 15 and the gain control amplifying circuit 14, respectively.

The blue signal B from the B-component output circuit 12B is supplied to transistors Q3 and Q6 and is thereby converted to a cathode current that flows to the blue cathode 21B of the cathode ray tube 20. In a like manner, transistors Q1 and Q4 are provided in association with a red cathode 21R of the cathode ray tube 20, while transistors Q2 and Q5 are provided in association with a green cathode 21G of the cathode ray tube 20, respectively. The transistors Q4, Q5 and Q6 are respectively connected with resistors R4, R5 and R6 having resistance values $M_1$, $M_2$ and $M_3$ in order to detect cathode currents for the black level. Also, resistors R1, R2 and R3, having corresponding resistance values $r_1$, $r_2$ and $r_3$, are provided in order to detect cathode currents for the white level. The resistance values $M_i$ and $r_i$ have established therebetween a relationship that is expressed as $$M_i : r_i \approx 100 : 1$$

The collectors of the transistors Q4, Q5 and Q6 are connected together to a single junction J via diodes D4, D5 and D6, and a cathode current signal E developed at the junction J is commonly supplied to the sample-and-hold circuits 18 and 19 in the R, G and B-component output circuits 12R, 12G and 12B. The resistors R1, R2 and R3 having small resistance value $r_i$ are connected in common through diodes D1, D2 and D3, respectively, to one fixed contact of a switch 25 whose other fixed contact is grounded.

A timing pulse generating circuit 22 will now be described in detail with reference to FIGS. 1A and 1B and waveform diagrams forming FIGS. 2A to 2E.

Figure 2A:
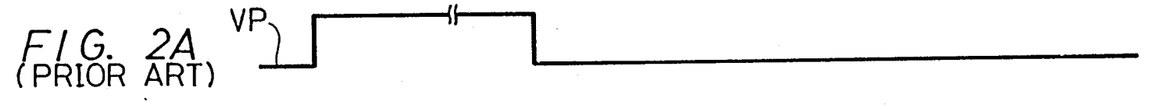
FIGS. 2A to 2E are waveform diagrams of signals appearing in the respective portions of the television receiver shown in FIG. 1, respectively.
Figure 2B:
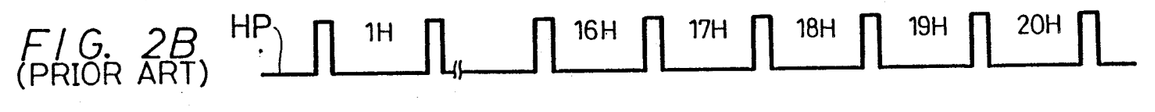
Figure 2C:
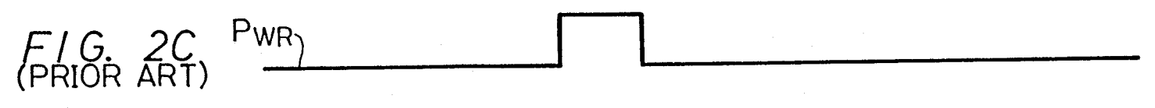
Figure 2D:
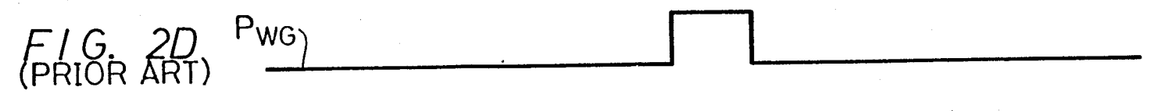
Figure 2E:
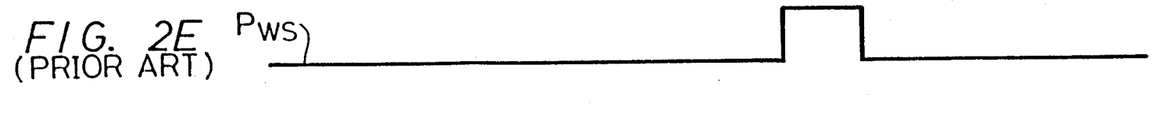

The timing pulse generating circuit 22 successively generates white level adjusting pulse signals $P_{WR}$, $P_{WG}$ and $P_{WB}$ during a 16th horizontal period (16H) to an 18th horizontal period (18H) as shown in FIGS. 2B–2E. The waveforms of the pulse signals $P_{WR}$, $P_{WG}$ and $P_{WB}$ are illustrated in FIGS. 2C, 2D and 2E, respectively. The timing pulse generating circuit 22 also generates sampling pulse signals $P_{WR1}$, $P_{WG1}$ and $P_{WB1}$ (FIG. 1) in synchronism with the series of pulse signals $P_{WR}$, $P_{WG}$ and $P_{WB}$. During this period, the timing pulse generating circuit 22 closes the switch 25 by delivering to it a control signal P1. During the next field, the timing pulse generating circuit 22 opens the switch 25 by the control signal P1 to generate black level adjusting pulse signals $P_{BR}$, $P_{BG}$ and $P_{BB}$ in series. In synchronism therewith, the timing pulse generating circuit 22 generates sampling pulse signals $P_{BR1}$, $P_{BG1}$ and $P_{BB1}$ in series. The white level adjusting pulse signals $P_{WR}$, $P_{WG}$ and $P_{WB}$ are converted to white reference level signals $V_{SW}$ by a white reference level setting circuit 23 and are fed to the corresponding reference level inserting circuits 13, respectively. On the other hand, the black level adjusting pulse signals $P_{BR}$, $P_{BG}$ and $P_{BB}$ are, respectively, converted to black reference level signals $V_{SB}$ by a black reference level setting circuit 24 and are fed to the corresponding reference level inserting circuits 13.

In this prior-art example, assuming that the black level is 5 IRE and that the white level is 50 IRE, then the resistance values r₃, M₃ and the comparing voltage $V_O$ will be determined so as to satisfy the equation expressed as $$I_W r_3 \approx I_B M_3 \approx V_O$$

where $I_B$ and $I_W$ are the cathode currents of black and white levels flowing to the blue cathode 21B of the cathode ray tube 20, respectively. If the resistance values r₃, M₃ and the comparing voltage $V_O$ are determined as described above, when the white level is pre-determined, the control signal $S_{WB}$ proportional to error is generated from the differential amplifier 17 and is fed to the gain control amplifying circuit 14, thereby correcting the gain of the gain control amplifying circuit 14. Also, when the black level is pre-determined, the control signal $S_{BB}$ proportional to error is generated from the differential amplifier 16 and is fed to the level shifting circuit 15, thereby correcting its cut-off level.

Particularly, in this prior-art example, the black level adjustment and the white level adjustment are effected alternately at every field. In addition, the level adjustment of R, G and B signals are sequentially carried out at every horizontal period H within the same field.

The prior-art white level adjustment is set out as above, and in other words, it will be summarized as follows.

In practice, a reference pulse signal (i.e. corresponding to a horizontal scanning line having an amount of light corresponding to the black or white level) is produced on the cathode ray tube and a voltage-converted-value of the cathode current at that time is compared with a previously-corrected reference voltage, whereby the drive current for a cathode is adjusted so as to remove error, thus the white level being adjusted. The horizontal scanning line having an amount of light corresponding to the black or white level is inserted into a so-called over-scan area or an under-scan area of the cathode ray tube so that it is not seen by the viewer.

Figure 3:
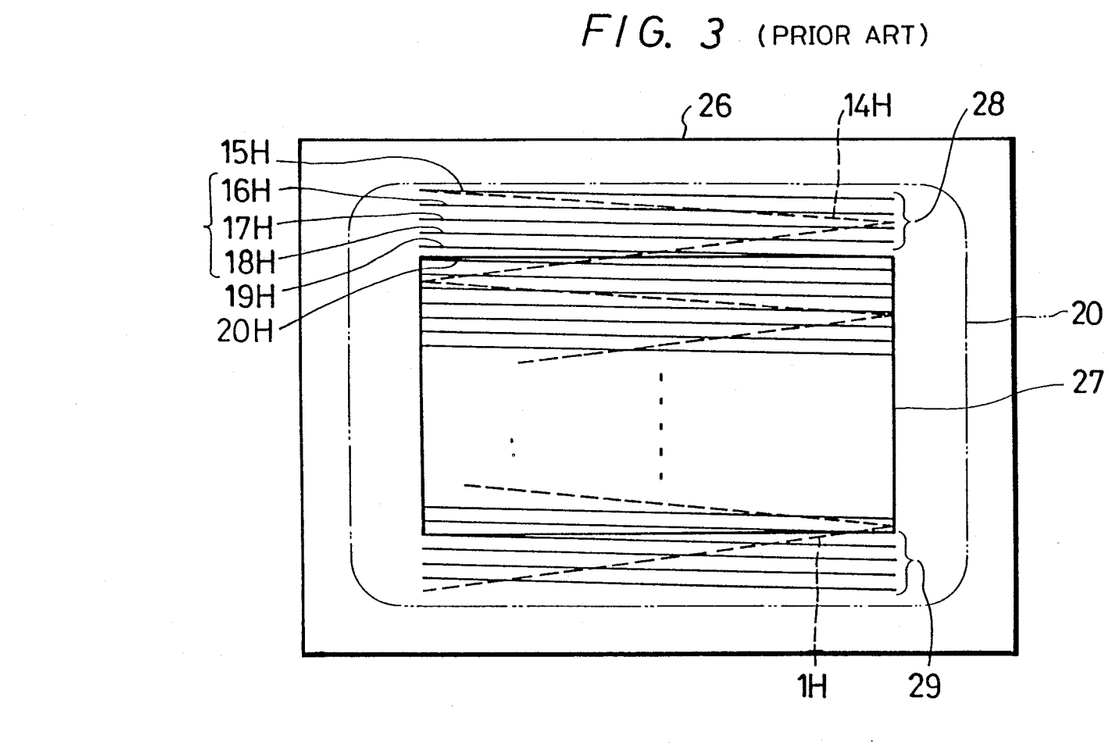
FIG. 3 is a front view of a prior-art television receiver.

FIG. 3 is a front view pictorially illustrating the viewing screen 27 of a television receiver 26. As shown in FIG. 3, the television receiver 26 has a viewable picture screen portion 27, which is bordered in full line in the figure. The fluorescent screen of the cathode ray tube 20 is constructed larger than the viewable portion of the television picture screen 27, in practice. Now, let it be assumed that in the odd field the vertical blanking begins with the 1st horizontal period 1H and ends with the 14th horizontal period 14H. In other words, a so-called retrace period of the horizontal scanning line lies between horizontal scanning lines 1H and 14H. The horizontal scanning lines from 15H to 18H reside in an over-scan area 28 that is outside the viewable portion of the television picture screen 27 while some scanning lines reside in an under-scan area 29.

While the white or black level reference pulse signal can be inserted into only the over-scan area 28 or the under-scan area 29, in the example of FIG. 1, the white level reference pulse signals of R, G and B channels are inserted into the scanning lines 16H to 18H as shown in FIG. 2, in which case no trouble occurs.

Figure 4:
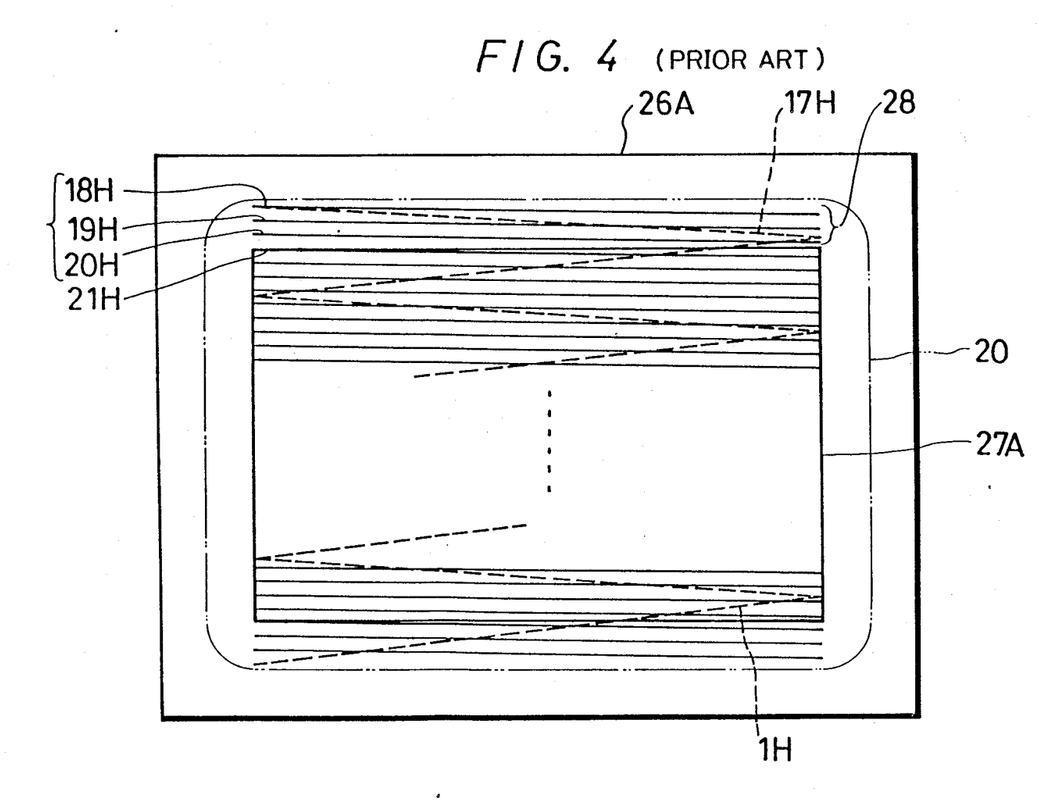
FIG. 4 is a front view of another prior-art television receiver whose retrace period is different from that of the television receiver shown in FIG. 3.

Recently, there have been developed various kinds of cathode ray tubes, and particularly, cathode ray tubes having a large television picture screen are given a long retrace period. FIG. 4 shows a television receiver 26A having a cathode ray tube 20A of which the retrace period ranges from 1H to 17H. In this case, the over-scan area 28, which is not within the viewable portion of the television picture screen 27A, includes only the horizontal scanning lines from 18H to 20H. The retrace period of the horizontal scanning line becomes different depending on the types of the television receiver because the characteristic of the deflection yoke used therein is changed with, mainly, the size of the cathode ray tube. Further, some known television monitor receivers for computers have an over-scan area that is smaller than the standard one.

In the prior-art automatic white balance adjusting circuit used in the television receiver shown in FIG. 1, however, in order to change the insertion position of the white or black level reference pulse signal (with which horizontal scanning period the insertion of the white or black level reference pulse signal begins), the timing pulse generating circuit 22 has to be exchanged or resistors and the like have to be exchanged. Eventually, in the prior-art television receiver, the standardization of its hardware does not make a remarkable progress.

OBJECTS AND SUMMARY OF THE INVENTION

Accordingly, it is an object of the present invention to provide an improved automatic level adjusting system for a television receiver which can remove the above-mentioned defects of the prior art.

Another object of the present invention is to provide a television receiver automatic level adjusting system which can be simplified in construction.

Still another object of the present invention is to provide an automatic level adjusting system for a television receiver which can be applied to various types of television receivers having different retrace periods.

Still another object of the present invention is to provide an automatic level adjusting system for a television receiver which can promote the standardization of the television receiver from a hardware-standpoint.

A further object of the present invention is to provide an automatic level adjusting system for a television receiver which is applied to a white balance adjusting apparatus that adjusts black level and white level simultaneously.

In accordance with an aspect of the present invention, there is provided a television receiver comprising:
  a video signal source for supplying a video signal;
  picture reproducing means; and
  an automatic level control circuit connected between said video signal source and said picture reproducing means, said automatic level control circuit including
    reference pulse insertion means for inserting a reference pulse signal into said video signal at a predetermined position,
    level detecting means connected between said reference pulse insertion means and said picture reproducing means for detecting a signal level at said predetermined position,
    level correction means connected between said video signal source and said picture reproducing means, and
    control means connected to said level detecting means for controlling said level correction means such that the level of the video signal is corrected in response to said detected level, characterized by
    a non-volatile memory to be stored with a positional datum corresponding to said predetermined position, and
    activating means connected between said non-volatile memory and said reference pulse insertion means for activating the latter to generate said reference pulse signal at said predetermined position in response to said positional datum stored in said non-volatile memory.

In accordance with another aspect of the present invention, there is provided a television receiver comprising:
  a video signal source for supplying a plurality of primary color signals;
  color picture reproducing means; and
  a corresponding plurality of automatic level control circuits connected between said video signal souce and said color picture reproducing means for receiving said plurality of primary color signals and for supplying level controlled primary color signals to said color picture reproducing means, respectively;
  each of said automatic level control circuits including
    reference pulse insertion means for inserting a reference pulse to the corresponding primary color signal at a predetermined position;
    level detecting means connected between said reference pulse insertion means and said color picture reproducing means for detecting the level of the primary color signal at said predetermined position,
    level correction means connected between said video signal source and said picture reproducing means, and
    control means connected to said level detecting means for controlling said level correction means such that the level of the primary color signal is corrected in response to said detected level, characterized by
    a non-volatile memory to be stored with positional data corresponding to said predetermined positions for said plurality of primary color signals, and
    activating means connected between said non-volatile memory and said reference pulse insertion means for activating the latter to generate said reference pulse signals at said predetermined positions in response to said positional data of said non-volatile memory.

BRIEF DESCRIPTION OF THE DRAWINGS

A better understanding of the objects, features and advantages of the invention can be gained from a consideration of the following detailed description of the preferred embodiment thereof, in conjunction with the figures of the accompanying drawings, wherein:

FIG. 1 (formed of FIGS. 1A and 1B drawn on two sheets of drawings to permit the use of a suitably large scale) is a block diagram showing an example of a television receiver having a prior-art automatic white balance adjusting circuit;

DETAILED DESCRIPTION OF THE PREFERRED EMBODIMENT

Figure 5:
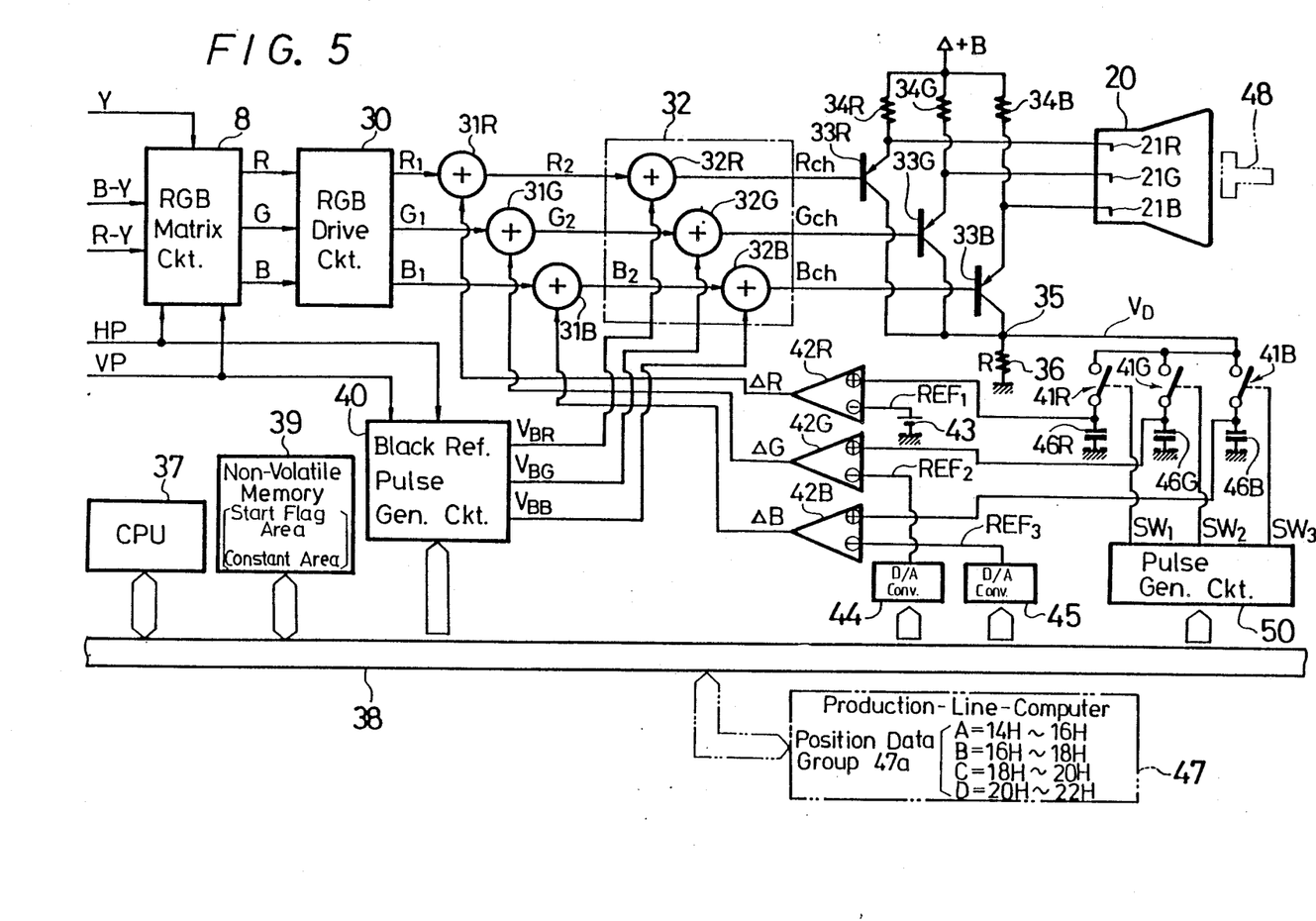
FIG. 5 is a block diagram showing an embodiment of an automatic level adjusting system for a television receiver according to the present invention.
Figure 6A:
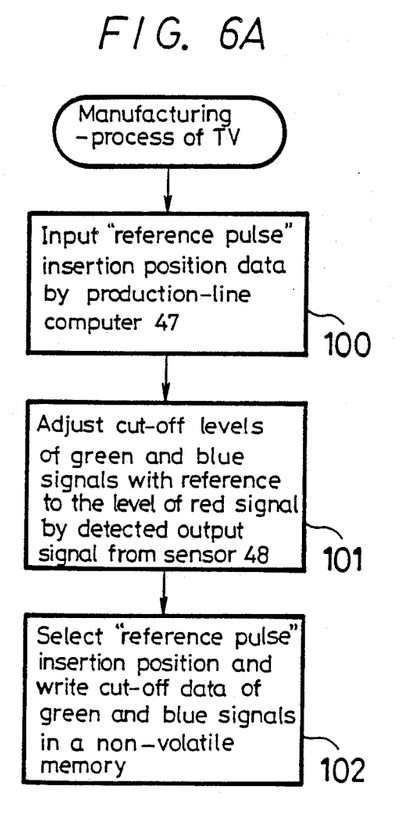
FIGS. 6A and 6B are, respectively, flow charts to which reference will be made in explaining the operation of the embodiment of the invention shown in FIG. 5.
Figure 6B:
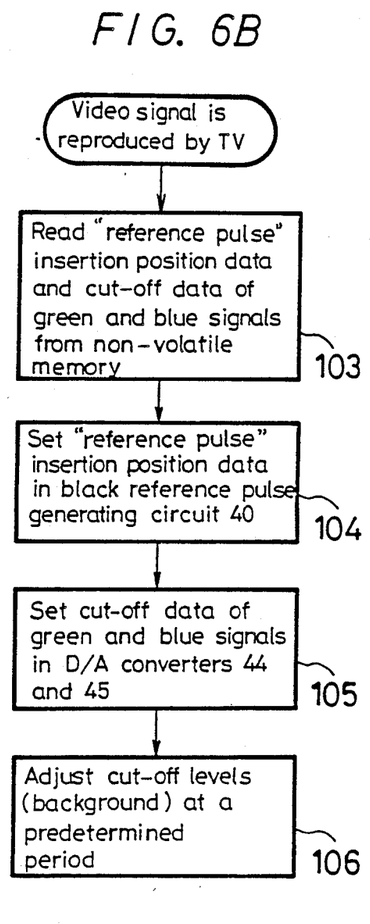

An embodiment of an automatic level adjusting system for a television receiver according to the present invention will now be described with reference to FIGS. 5 to 7. In FIG. 5, like parts corresponding to those of FIG. 1 are marked with the same references and therefore need not be described in detail.

A block diagram forming FIG. 5 illustrates a circuit arrangement of an embodiment of an automatic level adjusting system according to the present invention. This circuit arrangement corresponds to the circuitry succeeding to the RGB matrix circuit 8 in the example of FIG. 1A and thus includes the circuit elements 1-11, inclusive, of the circuit shown in FIG. 1A.

As FIG. 5 shows, there is provided an RGB drive circuit 30 that receives and independently amplifies the red, green and blue three primary color signals R, G and B derived from the RGB matrix circuit 8. The, thus, amplified red, green and blue primary color signals $R_1$, $G_1$ and $B_1$ are separately supplied to an input terminal of corresponding adding circuits 31R, 31G and 31B, respectively. The adding circuits 31R, 31G and 31B are respectively supplied at their other input terminals with correction signals $\Delta R$, $\Delta G$ and $\Delta B$ from differential amplifiers 42R, 42G and 42B that will be described later. The adding circuits 31R, 31G and 31B add the correction signals $\Delta R$, $\Delta G$ and $\Delta B$ to the three primary color signals $R_1$, $G_1$ and $B_1$ to produce, respectively, three primary color signals $R_2$, $G_2$ and $B_2$ that are fed to an RGB output circuit 32.

The RGB output circuit 32 includes three adding circuits 32R, 32G and 32B, wherein the adding circuit 32R is operative to add the red primary color signal $R_2$ to a black level red signal $V_{BR}$ to generate a red signal Rch. The red signal Rch is supplied to the base of a PNP transistor 33R. In the foregoing, the black level red signal $V_{BR}$ is generated from a black reference pulse generating circuit 40 that will be described more fully later. Similarly, the adding circuit 32G is operative to add the green primary color signal $G_2$ to a black level green signal $V_{BG}$ from the circuit 40 to generate a green signal Gch which is supplied to the base of a PNP transistor 33G. The adding circuit 32B adds the blue primary color signal $B_2$ to a black level signal $V_{BB}$ from the circuit 40 to generate a blue signal Bch which is fed to the base of a PNP transistor 33B.

The emitters of the PNP transistors 33R, 33G and 33B are respectively connected via resistors 34R, 34G and 34B to a direct current supply source $+B$. Further, these emitters are directly connected to a red cathode 21R, a green cathode 21G and a blue cathode 21B of the cathode ray tube 20, respectively. The collectors of the PNP transistors 33R, 33G and 33B are commonly connected to a junction 35 (its potential is represented by reference letter $V_D$). The junction 35 is grounded via a resistor 36.

A microcomputer is designated by reference numeral 37 and might be a central processing unit (CPU). The CPU 37, via a bus-line 38, reads data from a rewritable non-volatile memory 39 and issues various commands to the black reference pulse generating circuit 40. The non-volatile memory 39 includes a 2-bit start flag area, in which the encoded first number (14H, 16H, 18H or 20H, as will be described later) of the horizontal period into which the black reference pulse signal is inserted is stored, and a constant area in which cut-off values of two 16-bit digitized green and blue signals Gch and Bch are stored. The rewritable non-volatile memory 39 might be a metalized nitride-oxide silicon (MNOS)-type memory, by way of example.

The vertical and horizontal blanking pulses VP and HP are supplied by the horizontal deflection circuit 10 and the vertical deflection circuit 11, respectively, to the black reference pulse generating circuit 40 and the CPU 37, via the bus-line 38, sets in the black reference pulse generating circuit 40 the first number of the horizontal period into which the black reference pulse signal is inserted. In the black reference pulse generating circuit 40, the horizontal blanking pulse HP is counted by a counter that is reset in response to each leading edge of, for example, the vertical blanking pulse VP. When the count value reaches a predetermined value, the black level red signal $V_{BR}$, the black level green signal $V_{BG}$ and the black level blue signal $V_{BB}$ are sequentially supplied from the black reference pulse generating circuit 40 to the RGB output circuit 32 at every horizontal period (1H). In the present embodiment, the black level assumes a brightness of 10 IRE.

There are provided switches 41R, 41G and 41B each having a fixed contact commonly connected to the junction 35. The other fixed contacts of the switches 41R, 41G, and 41B are respectively grounded via capacitors 46R, 46G and 46B which are used to store and hold the voltage $V_D$ developed at the junction 35. The switches 41R, 41G and 41B are opened and closed in rsponse to control signals SW1, SW2 and SW3 that a pulse generating circuit 50 generates when it is driven by a control signal supplied from the CPU 37 through the bus-line 38. The other fixed contacts of the switches 41R, 41G and 41B are also connected to non-inverting input terminals (+) of the differential amplifiers 42R, 42G and 42G, respectively. The differential amplifier 42R receives at its inverting input terminal (−) a reference voltage $REF_1$ from a direct current reference voltage supply source 43, while the differential amplifiers 42G and 42B receive at their inverting input terminals (−) reference voltages $REF_2$ and $REF_3$ that are analog outputs from digital-to-analog (D/A) converters 44 and 45. The D/A converters 44 and 45 are each of an input value-holding type, and the CPU 37 reads two 16-bit data from the constant area of the non-volatile memory 39 and sets the same via the bus-line 38 in the D/A converters 44 and 45 sequentially.

In FIG. 5, a microcomputer 47 is a microcomputer for the production-line of the television receiver. The production-line computer 47 includes in its memory a positional data group 47a which is comprised of four data demonstrated in the following table 1.

TABLE 1

| Types of television receiver | Positional data group | Corresponding horizontal periods |
|---|---|---|
| A | 00 | 14H, 15H, 16H |
| B | 01 | 16H, 17H, 18H |
| C | 10 | 18H, 19H, 20H |
| D | 11 | 20H, 21H, 22H |

In the table 1, positional data [00], for example, means that the black reference pulse signal is inserted into the horizontal periods 14H, 15H and 16H. This corresponds to a television receiver of type A. Accordingly, in the television receiver of type A, the horizontal periods 14H to 16H are inserted into the over-scan area or the under-scan area. As is clear from the table 1, the automatic level adjusting system of the present embodiment can be applied to the television receivers of four types A, B, C and D whose retrace periods are different from one another (or the sizes of picture screens thereof are different).

Further, the production-line computer 47 indirectly measures the reference voltages $REF_2$ and $REF_3$ corresponding to the cathode currents flowing through the respective red, green and blue cathodes 21R, 21G and 21B, each having a brightness of black level (10 IRE), by the use of an optical sensor 48 which monitors the screen of the CRT tube 20, and converts the measured reference voltages $REF_2$ and $REF_3$ into 16-bit digital values. Then, the production-line computer 47 writes 2-bit positional data corresponding to the type of the television receiver and the reference voltages $REF_2$ and $REF_3$, which are converted in the form of two 16-bit digital values, into, respectively, the start flag area and the constant area of the non-volatile memory 39 via the bus-line 38. In this case, the reference signal $REF_1$ for the red signal Rch of the differential amplifier 42R is pre-determined from a hardware-standpoint and the level of the signal $REF_1$ serves as a standard for other reference signals $REF_2$ and $REF_3$.

The operation of the television receiver having the automatic level adjusting system of the present invention will be described with reference to flow charts forming FIGS. 6A and 6B.

In the manufacturing-process of the television receiver (FIG. 6A), the production-line computer 47 is connected to the bus-line 38 as shown in FIG. 5. Then, the production-line computer 47 sets a count value indicating the insertion position for adjusting the black reference pulse signal in the black reference pulse generating circuit 40 at step 100. As a position or period into which the black reference pulse signal is inserted, there is selected a horizontal period that can be detected by the sensor 48 with ease.

At the next step 101, the production-line computer 47 detects the output signal from the sensor 48 and adjusts the black levels, or the cut-off levels of the red, green and blue three color signals Rch, Gch and Bch. More specifically, the level of the red signal Rch serves as a standard and the cut-off levels of remaining two channels are thereby adjusted. Then, at step 102, the production-line computer 47 selects the insertion position of the black reference pulse corresponding to the type of the television receiver and writes the 2-bit code corresponding to the selected insertion position and the 16-bit cut-off data (reference voltages $REF_2$ and $REF_3$) of the green and blue signals Gch and Bch in the non-volatile memory 39.

When a video signal is reproduced by the television receiver after the manufacturing-process of the television receiver is finished (FIG. 6B) the CPU 37 of the television receiver reads the code indicating the insertion position of the black reference pulse signal and cut-off data of two color signals (green and blue signals Gch and Bch) from the non-volatile memory 39 at step 103. Then, the CPU 37 decodes the code indicative of the insertion position of the black reference pulse signal in accordance with the table 1 and sets the first number of the horizontal period (14H, 16H, 18H or 20H) in the black reference pulse generating circuit 40 at step 104. At the next step 105, the CPU 37 sets the, thus read, two cut-off data in the D/A converters 44 and 45, respectively.

When the above-mentioned initial setting is ended, the black reference pulse generating circuit 40 is activated so that the operation of the television receiver enters step 106, in which the cut-off levels (backgrounds) of the three color signals Rch, Gch and Bch are adjusted at at predetermined period (generally at one field period or one frame period). If the 2-bit data stored in the start flag area of the non-volatile memory 39 is [10], the black reference pulse signal is inserted into the horizontal periods 18H to 20H in accordance with the table 1.

Figure 7A:
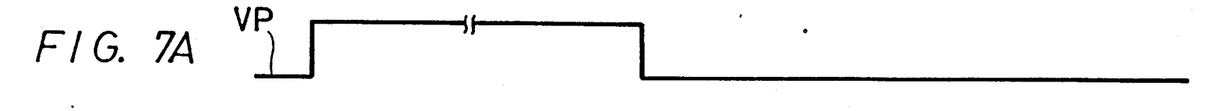
FIGS. 7A to 7F are, respectively, waveform diagrams of signals appearing on the respective portions of the circuit arrangement of the embodiment of the invention shown in FIG. 5.
Figure 7B:
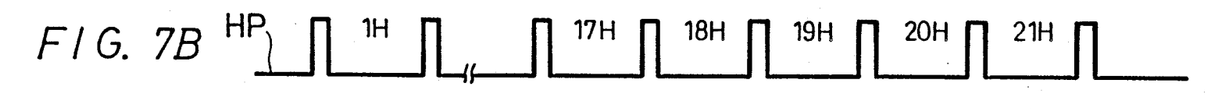
Figure 7C:
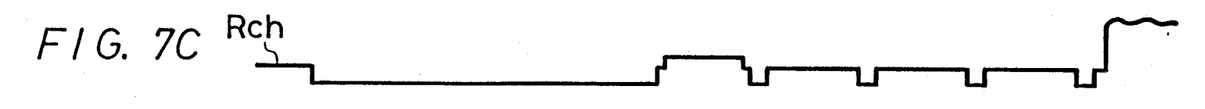
Figure 7D:
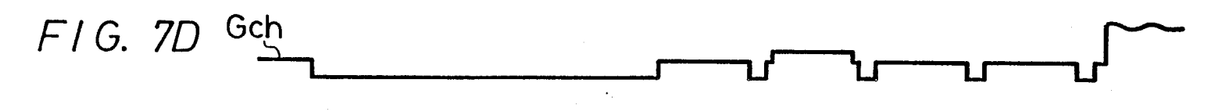
Figure 7E:
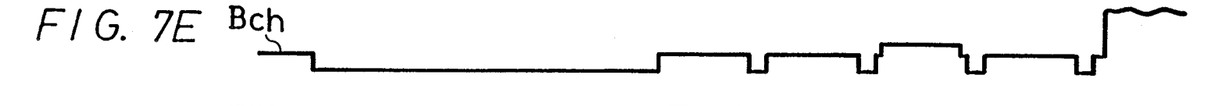
Figure 7F:
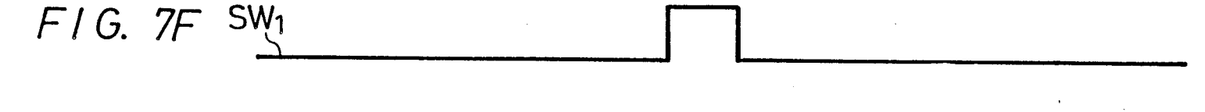

As shown in FIGS. 7C, 7D, and 7E, a signal having brightness corresponding to 10 IRE (black level) is outputted as the red signal Rch during the horizontal period 18H; a signal having brightness corresponding to 10 IRE is outputted as the green signal Gch during the horizontal period 19H; and a signal having brightness corresponding to 10 IRE is outputted as the blue signal Bch during the horizontal period 20H. During the horizontal period 18H, the control signal SW1 goes to high level [1] as shown in FIG. 7F to close the switch 41R, thereby storing the voltage $V_D$ corresponding to the cathode current of the red cathode 21R at that time in the capacitor 46R. Consequently, the error signal $\Delta R$ proportional to the difference between the stored voltage $V_D$ and the reference voltage $REF_1$ is fed back to the adding circuit 31R. In like a manner, the switches 41G and 41B are closed during the horizontal periods 19H and 20H, respectively. In this way, the television receiver having the automatic level adjusting system of the present embodiment can automatically correct the black level (cut-off level).

As set forth above, according to the automatic level adjusting system for a television receiver of the present invention, the insertion position of the black reference pulse signal can be changed by only changing the data to be written in the non-volatile memory 39 and the system can be applied commonly to various types of the television receivers whose retrace periods are different. Further, it can be expected that the standardization of the television receiver can be improved from a hardware-standpoint.

In the automatic level adjusting system of the present embodiment, as shown in FIG. 5, since the resistor 36 is commonly used to detect the cathode currents of the red, green and blue cathodes 21R, 21G and 21B, the circuit arrangement can be simplified and the number of connection pins of integrated circuit (IC) used can be reduced.

Further, the black levels of the respective color signals Rch, Gch and Bch are not simultaneously adjusted during one horizontal period but they are individually adjusted at separate horizontal periods, so it is possible to simplify the circuit arrangement by this fact.

While the automatic level adjusting system for a television receiver of the present invention adjusts only the black levels, the present invention is not limited to the above-mentioned black level adjustment but the present invention can be applied to an apparatus that automatically adjusts only the white level and to a white balance adjusting apparatus that adjusts the black level and the white level simultaneously.

Since the automatic level adjusting system for a television receiver of the present invention is constructed as set out, the insertion position of the black or white reference pulse signal can be changed without modifying the hardware of the television receiver and the automatic level adjusting system of the invention can be applied commonly to different types of television receivers.

It should be understood that the above description is presented by way of example on a single preferred embodiment of the invention and it will be apparent that many modifications and variations thereof could be effected by one with ordinary skill in the art without departing from the spirit and scope of the novel concepts of the invention so that the scope of the invention should be determined only by the appended claims.

We claim as our invention:

1. An improved television receiver of the type which includes a video signal source for supplying a video signal, picture reproducing means, an automatic level control circuit connected between said video signal source and said picture reproducing means, said automatic level control circuit including reference pulse insertion means for inserting a reference pulse signal into said video signal at a predetermined position, level detecting means connected between said reference pulse insertion means and said picture reproducing means for detecting a signal level at said predetermined position, level correction means connected between said video signal source and said picture reproducing means, and control means connected to said level detecting means for controlling said level correction means such that the level of the video signal is corrected in response to said detected level, wherein the improvement comprises:
a non-volatile memory for storing a positional datum corresponding to said predetermined position, and
activating means connected between said non-volatile memory and said reference pulse insertion means for activating the latter to generate said reference pulse signal at said predetermined position in response to said positional datum stored in said non-volatile memory.

2. A television receiver according to claim 1, further including means for setting said positional datum in said non-volatile memory.

3. A television receiver accordng to claim 2, wherein said setting means sets includes a bus-line connected between said non-volatile memory and said reference pulse insertion means and an outside computer for storing said positional datum into said non-volatile memory via said bus-line.

4. A television receiver according to claim 3, wherein said outside computer is a television production line computer.

5. A television receiver according to claim 1, wherein said activating means including a bus-line connected between said non-volatile memory and said reference pulse insertion means.

6. A television receiver according to claim 1, wherein said reference pulse is either a black or white reference pulse.

7. A television receiver according to claim 1, wherein said non-volatile memory also stores a cutoff datum of said picture reproducing means.

8. A television receiver according to claim 1, wherein said reference pulse insertion means includes a reference pulse generator for generating a reference pulse signal, and an adding circuit connected between said video signal source and said reference pulse generator for inserting said reference pulse signal into said video signal.

9. A television receiver comprising:
a video signal source for supplying a plurality of primary color signals;
color picture reproducing means;
a corresponding plurality of automatic level control circuits connected between said video signal source and said color picture reproducing means for receiving said plurality of primary color signals and for separately supplying level controlled primary color signals to said color picture reproducing means;
each of said automatic level control circuits including:
reference pulse insertion means for inserting a reference pulse into the corresponding primary color signal at a predetermined position;
level detecting means connected between said reference pulse insertion means and said color picture reproducing means for detecting the level of the primary color signal at said predetermined position;
level correction means connected between said video signal source and said picture reproducing means; and
control means connected to said level detecting means for controlling said level correction means such that the level of the primary color signal is corrected in response to said detected level, said control means including:
a non-volatile memory for storing positional data corresponding to said predetermined positions for said plurality of primary color signals, and
activating means connected between said non-volatile memory and said reference pulse insertion means for activating the latter to generate said reference pulse signals at said predetermined positions in response to said positional data of said non-volatile memory.

10. A television receiver according to claim 9, wherein said activating means includes a bus-line connected between said non-volatile memory and said reference pulse insertion means.

11. A television receiver according to claim 10, wherein said positional data are stored into said non-volatile memory via said bus-line from an outside computer.

12. A method of adjusting the white balance of a television receiver which comprises the steps of:
supplying a video signal;
storing in a non-volatile memory a positional datum corresponding to a predetermined position in said video signal;
generating a reference pulse signal at the predetermined position in response to said positional datum stored in said non-volatile memory;
inserting said reference pulse signal into said video signal at said predetermine position;
detecting a signal level at a predetermined position; and
controlling the level of the video signal so that it is corrected in response to said detected level.

13. A method of adjusting the white balance of a television receiver as recited in claim 12, wherein the step of storing the positional datum in the non-volatile memory occurs during manufacturing of the television receiver.

14. A method of adjusting the white balance of a television receiver as recited in claim 12, wherein the step of generating the reference pulse comprises generating a black reference pulse.

15. A method of adjusting the white balance of a television receiver as recited in claim 12, wherein the step of generating the reference pulse comprises generating a white reference pulse.

16. A method of adjusting the white balance of a television receiver as recited in claim 12, further comprising the step of storing picture reproducing cutoff datum for the television receiver.

17. A method of reproducing and white balancing a video signal comprising the steps of:
supplying a plurality of primary color signals;
for each of the primary color signals, storing in a non-volatile memory positional data corresponding to predetermined positions in said plurality of primary color signals;
generating reference pulse signals for each of the primary color signals at said predetermined positions in response to said positional data stored in said non-volatile memory;
inserting a reference pulse into each corresponding primary color signal at the corresponding predetermined position;
detecting the level of each primary color signal at said corresponding predetermined positions;
controlling the level of each primary color signal in response to said detected levels; and
reproducing the level controlled primary color signals as a visual image.

* * * * *